(12) United States Patent
Jack et al.

(10) Patent No.: US 6,849,985 B2
(45) Date of Patent: Feb. 1, 2005

(54) ELECTRICAL MACHINE STATOR AND ROTOR

(75) Inventors: Alan G. Jack, Hexham (GB); Barrie Mecrow, Tyne and Wear (GB); Öystein Krogen, Malmköping (SE)

(73) Assignee: Höganäs AB, Höganäs (SE)

( * ) Notice: Subject to any disclaimer, the term of this patent is extended or adjusted under 35 U.S.C. 154(b) by 0 days.

(21) Appl. No.: 10/168,108

(22) PCT Filed: Dec. 13, 2000

(86) PCT No.: PCT/SE00/02511

§ 371 (c)(1),
(2), (4) Date: Oct. 28, 2002

(87) PCT Pub. No.: WO01/48890

PCT Pub. Date: Jul. 5, 2001

(65) Prior Publication Data

US 2003/0122442 A1 Jul. 3, 2003

(30) Foreign Application Priority Data

Dec. 23, 1999 (SE) .............................. 9904799

(51) Int. Cl.[7] .............................. H02K 1/00
(52) U.S. Cl. ..................... 310/216; 310/218
(58) Field of Search ............... 310/216–218, 310/166, 258–259, 44

(56) References Cited

U.S. PATENT DOCUMENTS

| 4,504,750 | A | * | 3/1985 | Onodera et al. ............... 310/12 |
| 4,700,133 | A | * | 10/1987 | Day ...................... 324/207.15 |
| 4,728,830 | A | * | 3/1988 | Gamble ...................... 310/12 |
| 4,947,065 | A | | 8/1990 | Ward et al. |
| 5,294,856 | A | * | 3/1994 | Horst .......................... 310/181 |
| 6,194,805 | B1 | * | 2/2001 | Heese et al. ................ 310/166 |

FOREIGN PATENT DOCUMENTS

| JP | 7298578 | 11/1995 |
| RU | 2 104 605 | 2/1998 |
| SE | 9801401.2 | 12/1999 |
| WO | WO 95/12912 | 5/1995 |
| WO | WO 99/50949 | 10/1999 |
| WO | WO 99/54985 | 10/1999 |

* cited by examiner

*Primary Examiner*—Thanh Lam
(74) *Attorney, Agent, or Firm*—Burns, Doane, Swecker & Mathis, LLP (57) ABSTRACT

A stator or a rotor for an electrical machine comprises a plurality of circumferentially separated, radially extending teeth, wherein each tooth having a single winding and is provided with an axially and radially extending reluctance barrier to increase the reluctance of each tooth regarding propagation of a magnetic field not interacting with the winding of said tooth.

9 Claims, 7 Drawing Sheets

ELECTRICAL MACHINE STATOR AND ROTOR

TECHNICAL FIELD OF THE INVENTION

The present invention is generally related to electrical machines and more specifically to a stator or a rotor for an electrical machine.

BACKGROUND OF THE INVENTION

Conventionally, the stator assembly of an electrical machine has a stator core formed of a stack of steel laminations. As an alternative to the use of steel laminations, the stator core may be formed from iron powder, as exemplified by U.S. Pat. No. 4,947,065 disclosing a stator moulded in one-piece, and by International Patent Application WO95/12912 disclosing a stator comprising a plurality of separate and substantially identical parts.

By its very nature any compacted, non-sintered material will not be fully dense. This means that soft iron powder currently available will have permeabilities that are lower than the permeabilities obtainable with steel laminations. However, magnetic powder composites could offer advantages such as isotropic magnetic behaviour, reduction in iron losses at high frequencies, improved thermal characteristics and flexible design and assembly.

The use of a single tooth geometry could give rise to large benefits when it comes to thermal and manufacturing properties of electrical machines. However, for an induction machine, the single tooth winding can result in a reduced performance due to increased content of MagnetoMotive Force (MMF) harmonics compared to a traditional distributed overlapping winding design.

The patent application SE 9801401-2 discloses an induction machine stator with a single tooth geometry that is arranged to reduce higher order MMF harmonics. These higher order harmonics couples to the rotor and result in increased losses, parasitic torques, etc. Said stator reduces harmonics, but can result in a reduction of performance compared to the traditional distributed overlapping winding design.

SUMMARY OF THE INVENTION

An object of the present invention is to provide a stator or a rotor for an electrical machine which benefits from the use of the single tooth geometry and results in an improved efficiency of the electrical machine.

The object is accomplished by providing a stator or a rotor. Preferred embodiments of the invention are disclosed in the dependent claims.

More particularly, according to one aspect of the invention, there is provided a stator for an electrical machine comprising a plurality of circumferentially separated, radially extending teeth, wherein each tooth has a single winding and is provided with an axially and radially extending reluctance barrier to increase the reluctance of each tooth regarding propagation of a magnetic field that does not interact with the winding of said tooth.

A stator provided with said reluctance barrier is advantageous in that the leakage flux, i.e. the magnetic field, from the rotor, that is not interacting with windings of two adjacent teeth of the stator, is reduced. The reduction of said leakage flux is achieved by increasing the reluctance in the propagation path of the leakage flux by means of the reluctance barrier in the teeth. The reduction of the leakage flux results in an increase of the magnetic field that is interacting with the windings of two adjacent teeth. Thus, the performance of the electrical machine are increased.

The reluctance barrier could be arranged in a number of ways. In one embodiment it is an axially and a radially extending gap in the tooth. The gap could extend radially and axially through the whole body of the tooth, dividing the tooth into two portions, thus circumferentially separating the two portions from each other.

According to another embodiment, said gap is arranged in such a way that it does not divide the tooth into two separate portions. Instead the gap extends partially through the tooth in the axial direction, partially through the tooth in the radial direction, or partially through the tooth in both the radial and axial direction. An embodiment where the gap is not dividing the tooth into two separate portions is preferably used when sufficient reluctance can be achieved by a partially extending gap.

Further, the gap could be filled with a material having greater reluctance than the reluctance of the tooth.

The reluctance barrier could also be arranged as a radially and an axially extending volume of the tooth comprising a plurality of bores or smaller volumes filled with air or a material of greater reluctance than the reluctance of the tooth.

According to a preferred embodiment, a tip of a tooth extends towards a tip of an adjacent tooth in such degree that a slot is formed between the tips of adjacent teeth. The advantage of this embodiment is that said slot introduces further reluctance in the propagation path of the leakage flux.

The electrical machine could, for example, be an induction machine, an electrical machine having a permanent magnet rotor, a synchronous motor, etc.

In one preferred embodiment of the invention the electrical machine is an induction machine. An advantage of providing an induction machine, which benefits from the use of a single tooth geometry, with a stator according to the invention, is that the torque characteristic of the induction machine is improved.

According to another preferred embodiment the stator is divided into at least two stator sections at two different axial positions, each section having a plurality of circumferentially separated, radially oriented teeth and each tooth having a single winding. The effect of other harmonics than the working harmonics may then be reduced by a mutual phase shift of the sections.

The effect produced by several stator sections on a single rotor is substantially the same as a distributed winding. This leads to the cancelling of a large fraction of the higher harmonics while keeping the benefits of single tooth windings, i.e. high slot fill factor, and simple manufacturing and assembling.

All the above-mentioned aspects, embodiments, and advantages could as well be applied to a rotor instead of a stator.

A further scope of applicability of the present invention will become apparent from the detailed description given below. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other features and advantages of the present invention will become apparent from the following detailed description of a presently preferred embodiment, with reference to the accompanying drawings, in which FIG. 3b is a view along line IIIb—IIIb in FIG. 3a.

DETAILED DESCRIPTION OF A PRESENTLY PREFERRED EMBODIMENT

Figure 1:
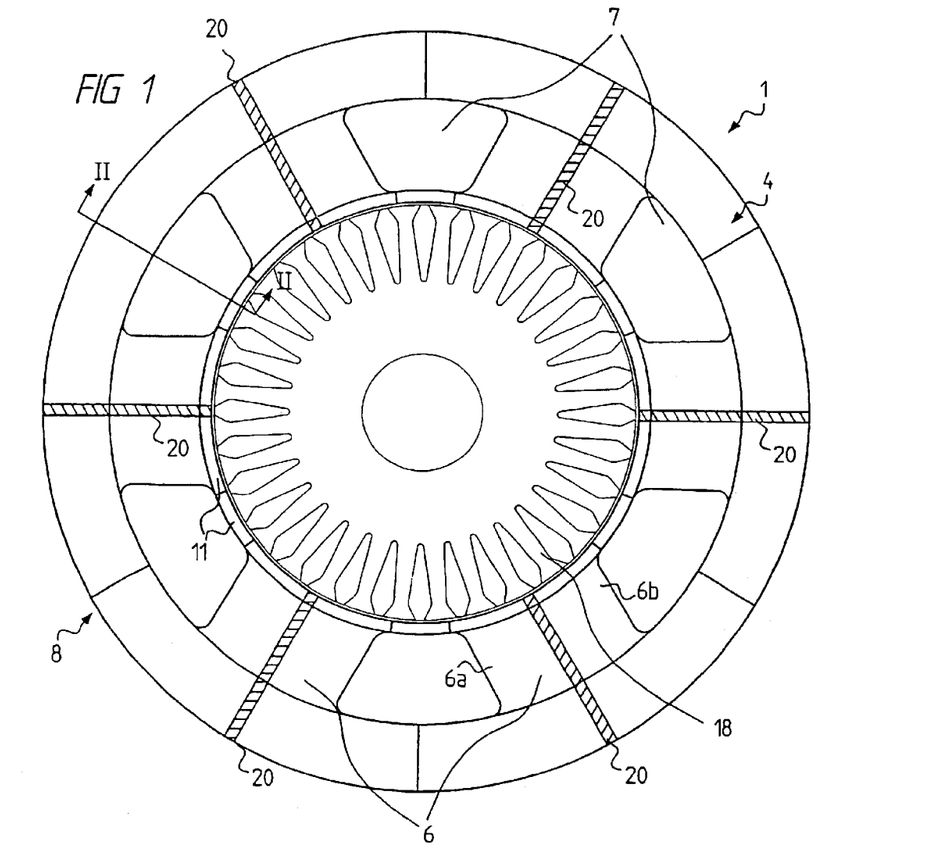
FIG. 1 is an end view of a stator and a rotor for a 4 pole 3 phase induction motor according to one embodiment of the invention.
Figure 2:
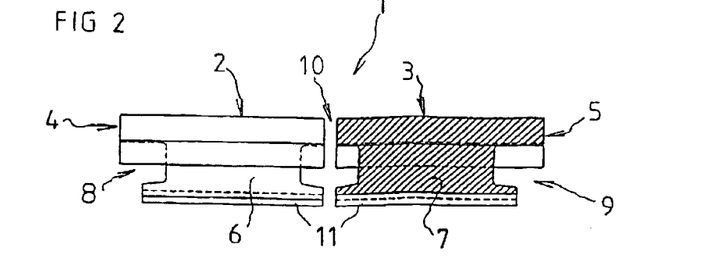
FIG. 2 is an axial cross-sectional view along line II—II in FIG. 1.

Referring to FIGS. 1 and 2, a stator 1 of an induction motor is illustrated as having two axially separated stator sections 2 and 3. Each one of the stator sections has a yoke section 4 and 5, respectively, adjoining six circumferentially separated, radially extending teeth 6 and 7, respectively.

Each tooth 6 is preferably divided into two portions 6a,b which are circumferentially separated by a gap 20. In the preferred embodiment the gap 20 also extends through the yoke section 4 that is integrated with the tooth 6. However, the gap 20 does not necessarily extend through said yoke section 4, especially if the yoke section 4 and the tooth 6 are not integrated. The teeth 7 have a corresponding shape.

Further, each tooth 6 and an adjoining part of the corresponding yoke section 4 form a separate unit or segment 8. Similarly, each tooth 7 and an adjoining part of the corresponding yoke section 5 form a separate unit or segment 9.

The yoke sections 4 and 5 are physically phase shifted by 180° electrical ± an angle related to skew (not shown). Their electrical supplies are also shifted by 180° electrical. Further, the stator sections 2 and 3 are separated by a small air gap 10 so as to reduce the mutual influence of the magnetic fields in the two stator sections 2 and 3.

As a result, each stator section will contain the same harmonics, but the phase shifting of them will, as seen from the single rotor (18), cancel a large fraction of the unwanted higher order harmonics.

Assembling each of the stator sections 2 and 3 from the separate units 8 and 9, respectively, permits an easy winding of each unit of the stator 1.

The multiple separate units 8 and 9 (twelve in the current embodiment) are made of a soft magnetic powder composite material which is filled into a die, pressed to a desired shape and then heat treated at a relatively low temperature so as not to destroy the necessary insulating layer between the powder particles. This means that volume production of the separate units 8 and 9 is possible and results in no material waste and a finished pressed unit with high tolerances and little or no machining being required.

As shown for one unit 8 and one unit 9 in FIG. 2, the axial length of each tooth 6, 7 is less than the axial length of the adjoining part of the yoke section 4, 5. The extension of the yoke sections 4, 5 axially past the teeth 6, 7 is asymmetric on the two axial sides thereof and increases the active length of the core and reduces the iron losses and magnetizing current such that a more efficient machine is provided. Further, the heat transfer from the windings to the stator is improved by the axial extensions of the yoke adjoining the coil turn parts outside the winding slots.

The above described design may be used for reducing the total winding length and thereby reduce the dimensions of the electrical machine with maintained performance.

Figure 3A:
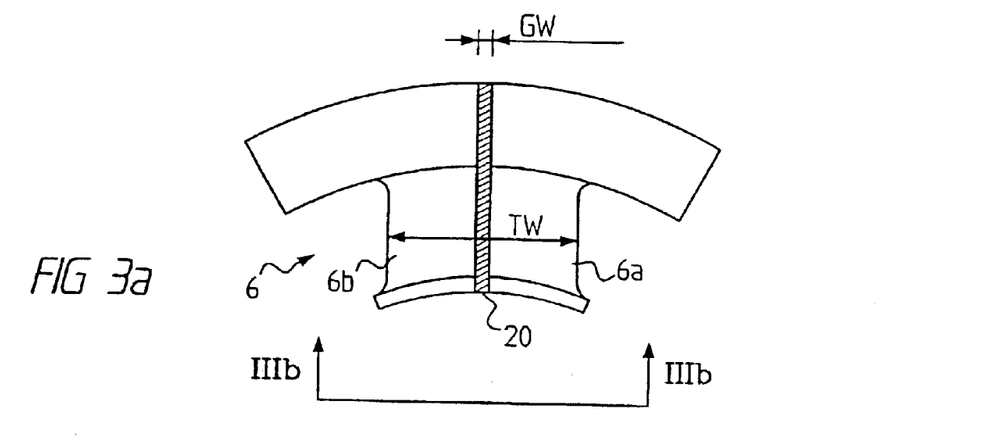
FIG. 3a is an end view of one tooth of the stator in FIG. 1.
Figure 3B:
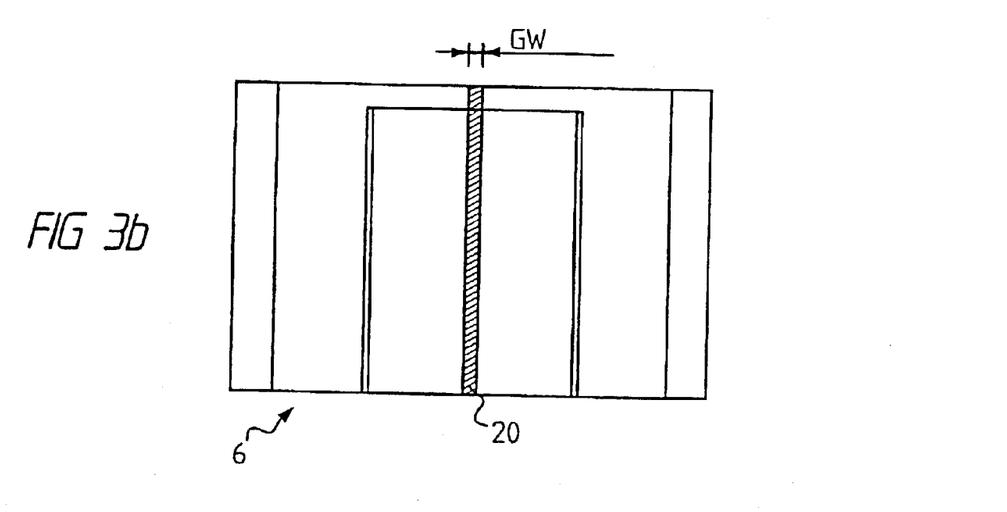
Figure 4:
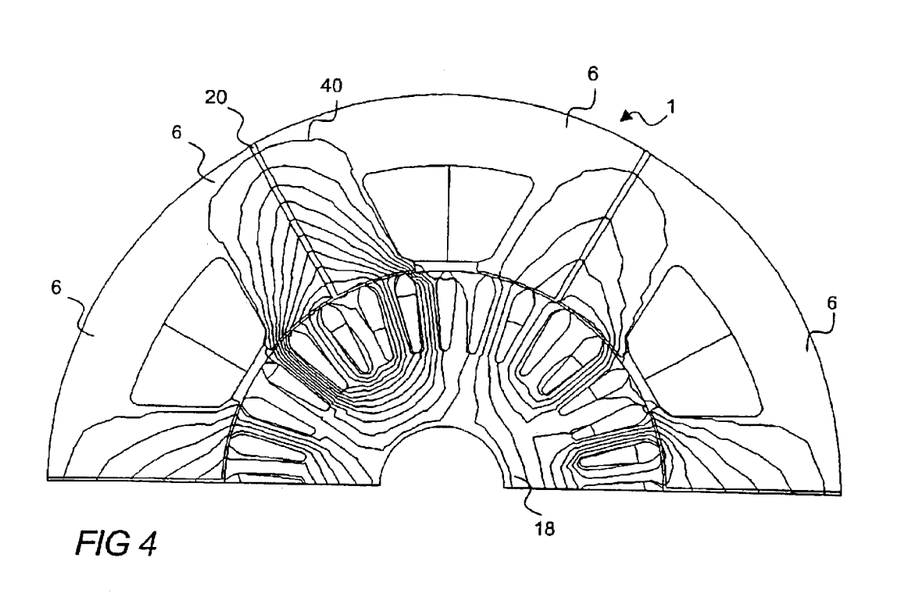
FIG. 4 is an end view of the stator and the rotor in FIG. 1 showing the propagation of the magnetic field from a rotor.

Referring to FIGS. 3a and 3b, according to a preferred embodiment, the gap 20, which divides a tooth 6 into two portions 6a,b, has a width, GW, of less than 20 percent, preferably less than 10 percent, of the width, TW, of a tooth body. The gap 20 is filled with a material having high reluctance, for decreasing a leakage flux 40, see FIG. 4.

The material filling the gap 20 is also provided to keep the two portions 6a,b of the tooth 6 separated, so that the width GW of the gap 20 is maintained when the two portions 6a,b of the tooth 6 are pressed against each other.

Figure 5A:
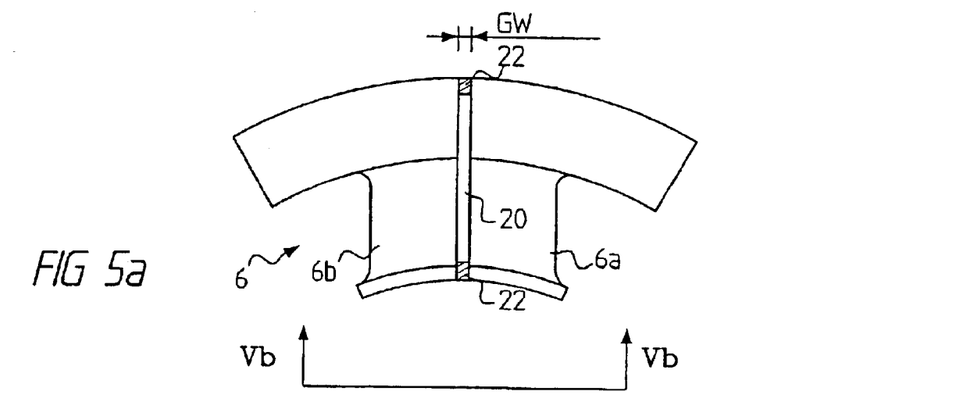
FIG. 5a is an end view of one tooth of a stator according to an embodiment of the invention.
Figure 5B:
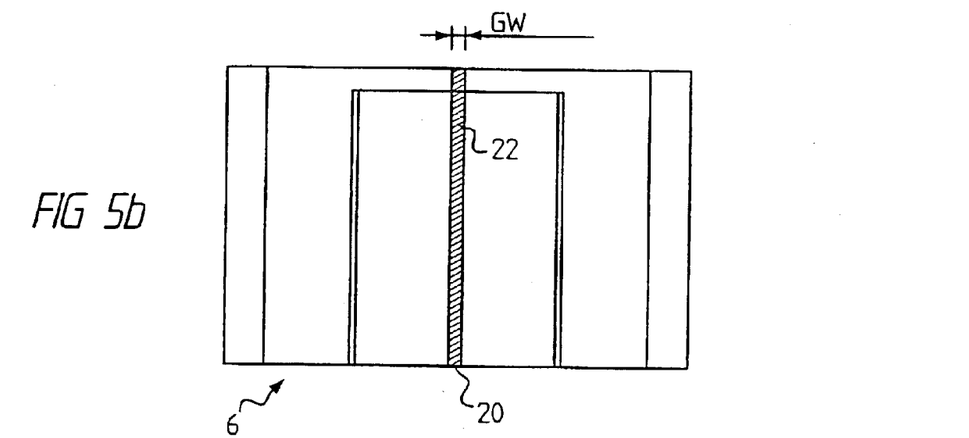
FIG. 5b is a view along line Vb—Vb in FIG. 5a, FIG. 6a is an end view of one tooth of a stator according to an embodiment of the invention.

Now referring to FIGS. 5a and 5b, however, if the gap 20 is to be filled with e.g. air, the separation could be provided by means of smaller separation means 22, which only fills a portion of the volume of the gap 20. Such smaller separation means 22 could, for example, be pieces of material having high reluctance, be formed to fill the gap 20 in the direction of GW and in the axial direction, and be formed to extend only over a small distance of the gap in the radial direction. The separation means 22 could be arranged to extend radially instead of axially.

Figure 6A:
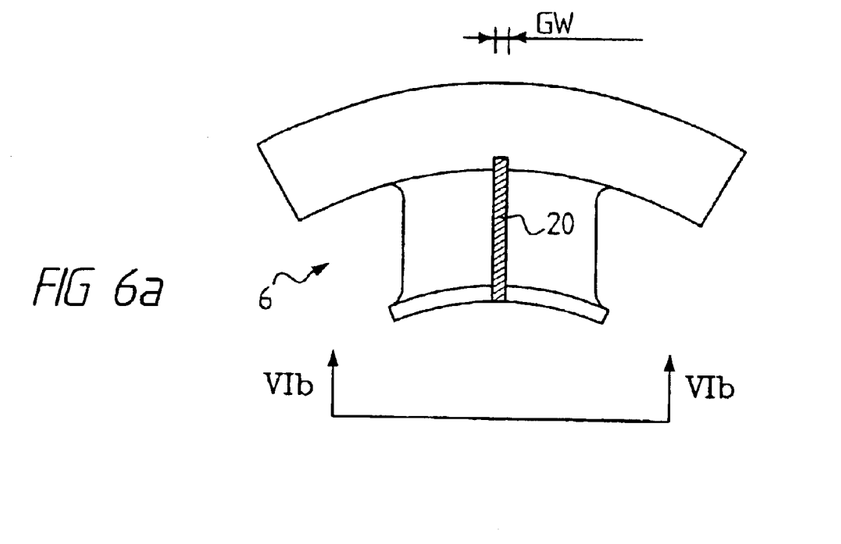
Figure 6B:
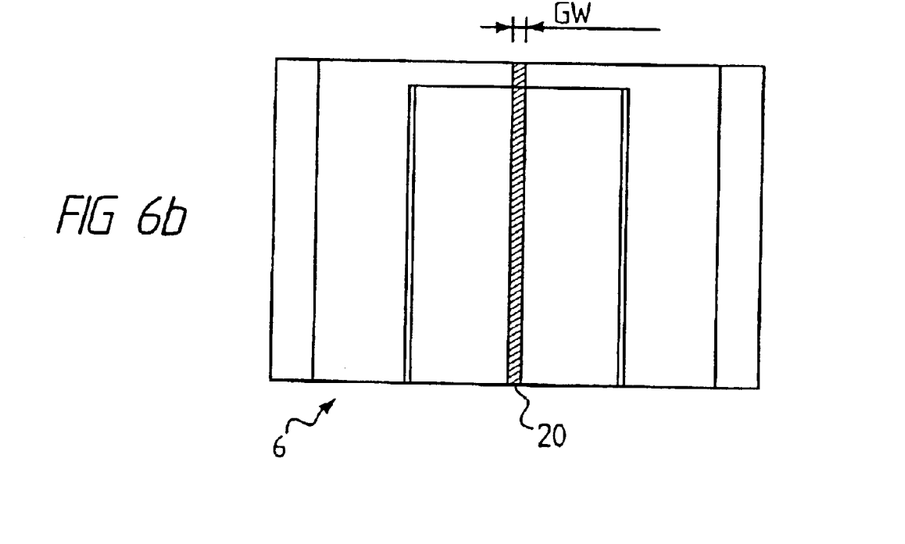
FIG. 6b is a view along line VIb—VIb in FIG. 6a, FIG. 7a is an end view of one tooth of a stator according to an embodiment of the invention.
Figure 7A:
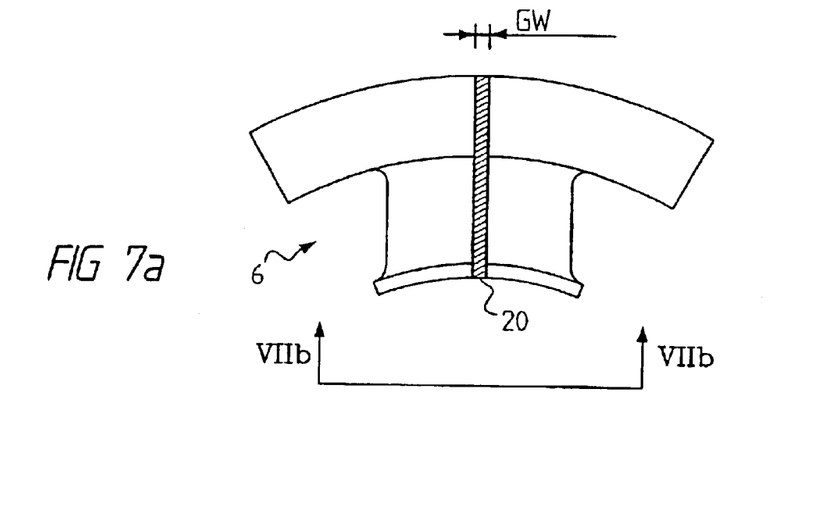
Figure 7B:
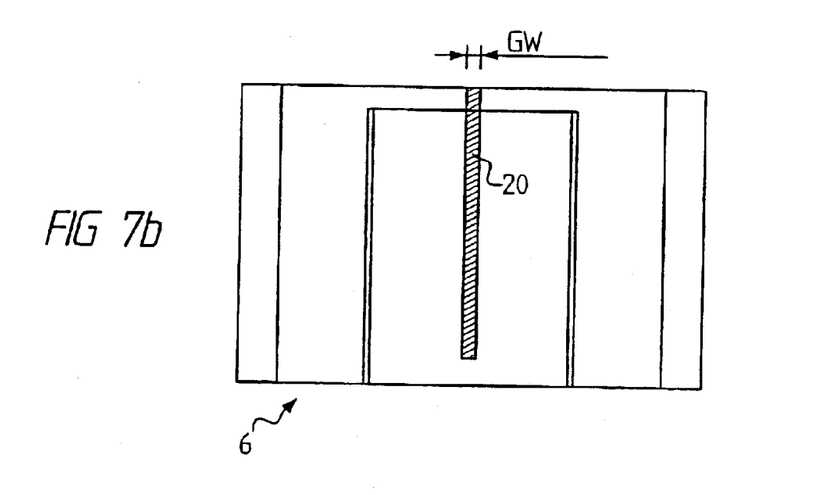
FIG. 7b is a view along line VIIb—VIIb in FIG. 7a, and FIG. 8 is an end view of two adjacent teeth of the stator in FIG. 1.

According to other embodiments, the gap 20 does not have to divide the tooth 6 into two separate portions 6a,b. The gap 20 could be arranged to extend partially through the tooth in the radial direction and totally through the tooth in the axial direction, see FIGS. 6a and 6b. However, the gap 20 could also be arranged to extend partially through the tooth 6 in the axial direction and totally through the tooth 6 in the radial direction, see FIGS. 7a and 7b. Any of these two embodiments can be used as long as the reluctance in the propagation path of the leakage flux reaches a sufficient level.

Figure 8:
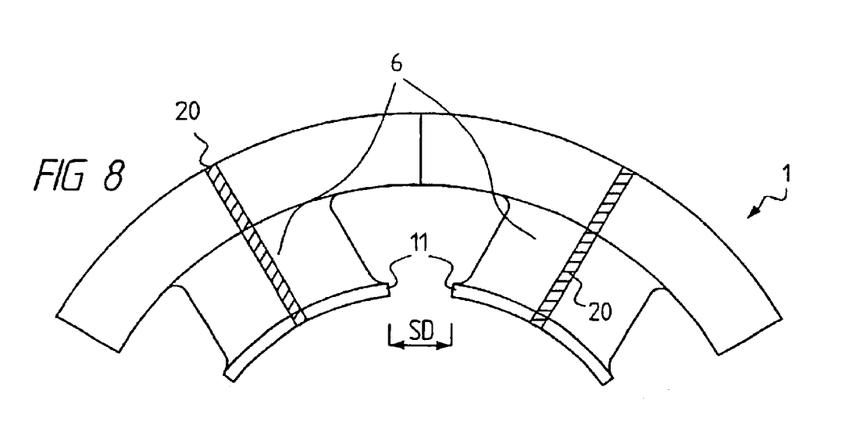

Referring to FIG. 8, according to a preferred embodiment, tooth tips 11 of two circumferentially adjacent teeth 6 are arranged to extend towards each other such a distance that a slot SD is formed between them.

As illustrated in the drawings, the tips 11 of the teeth 6 and 7 also extend axially past the main part of the teeth on both axial sides thereof. The extension of the teeth tips allows a reduction in the air gap reluctance which produces a corresponding reduction in magnetizing current. This offsets the deleterious effects of the relatively low permeability of powder iron.

A further advantage of using powder material is that the sectional tooth profile may be rounded or oval such that sharp bending of the coil turns is eliminated and the risk of penetration of the insulation at the corners is reduced. This allows thinner insulation to be used resulting in a substantial thermal benefit. The winding arrangement may comprise a non-overlapping winding on each tooth which simplifies the winding operation and allows very high packing factors to be achieved.

It should be noted that the rotor 18 (shown in FIG. 1) of the induction motor preferably is of conventional design.

While only one embodiment of the present invention is described above, it is obvious to those skilled in the art that the several modifications are possible without departing from the spirit of the present invention.

Thus, the invention can be used in machines having an outer rotor instead of the exemplified inner rotor.

Further, the material of the stator may comprise laminations or a powder material combined with other materials, e.g. laminations, or the stator may be made by casting.

What is claimed is:

1. A stator for an electrical machine comprising a plurality of circumferentially separated, radially extending teeth, wherein each tooth has a single winding and is provided with an axially and radially extending reluctance barrier to increase the reluctance of each tooth regarding propagation of a magnetic field that does not interact with the winding of said tooth.

2. A stator according to claim 1, wherein said reluctance barrier is a gap extending axially and radially in each tooth.

3. A stator according to claim 2, wherein said gap of each tooth contains at least one material having greater reluctance than the material of the tooth.

4. A stator according to claim 2, wherein said gap of each tooth contains air.

5. A stator according to claim 2, wherein the gap of each tooth positions the portions of the tooth at a distance from each other that corresponds to less than 20 percent of the width of the tooth body.

6. A stator according to claim 2, wherein the gap of each tooth positions the portions of the tooth at a distance from each other that corresponds to less than 10 percent of the width of the tooth body.

7. A stator according to claim 1, wherein each tooth is provided with inner edges that extends towards the adjacent teeth only in such degree that a slot is formed between the inner edges of adjacent teeth.

8. A stator according to claim 1, wherein said electrical machine is an electrical induction machine.

9. A stator according to claim 8, wherein said electrical induction machine further comprises at least two stator sections at two different axial positions, each section having a plurality of circumferentially separated, radially extending teeth, the stator sections being mutually phase shifted as to reduce the effect of other harmonics than the working harmonics.

* * * * *